United States Patent Office 3,027,049
Patented Mar. 27, 1962

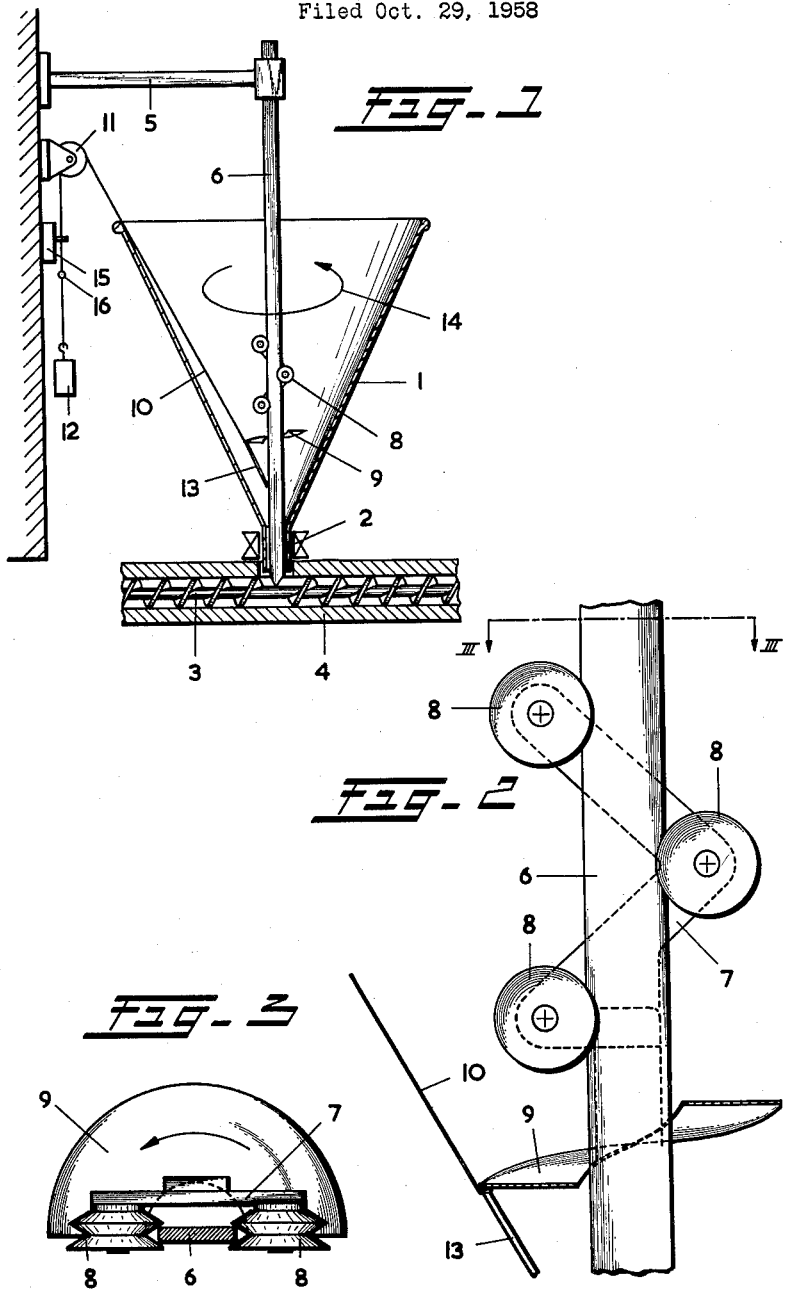

3,027,049
FILLING AND MIXING APPARATUS FOR POWDERED AND GRANULAR MATERIAL
Franciscus Roffelsen, Mauritslaan 7, Helmond, Netherlands
Filed Oct. 29, 1958, Ser. No. 770,325
6 Claims. (Cl. 222—41)

This invention relates to an apparatus by means of which powdered and granular material can be fed from a container of a comminuting or mixing machine or the like to a device for working up or for conveying said material. The object of the invention is to provide an apparatus of this type in which materials that do not flow readily and have a tendency to coalesce, such as those which are, for example, worked up in the synthetic material and dyestuff industry, can be caused to flow in a steady stream from a hopper through a relatively narrow opening into a device for further working up said material, while at the same time a further mixing of various ingredients of which the material may be composed and more particularly the breaking up of agglomerates, if any, in said material and the mixing of parts in powdered or granular form loosed from such agglomerates with the other material is effected.

To achieve this end the apparatus according to the invention comprises a hopper rotatable about a vertical axis, the bottom of which tapers downwardly towards an outlet opening and which is adapted to receive material from the container of a mixing or comminuting machine, a stationary, non-rotatable prismatic guide member, preferably having a cross-section of a flat rectangular shape, said guide member being located in the axis of rotation of said hopper and extending into the outlet opening the cross-sectional area is only partly taken up by said member, an annular or sector-shaped disc helically wound in a direction opposite to the direction of rotation of said hopper and at least partly surrounding the guide member and being mounted for upward and downward movement along said guide member, said disc carrying at least one scraping means at or adjacent its circumference. Said scraping means preferably consist of a rod extending downwardly from the periphery of the helically wound disc to a point adjacent the prismatic guide member and substantially parallel to the bottom of the hopper. According to a further feature of the invention other scraping means may consist of a cord, rope or wire running from the helically wound disc to a stationary pulley located above the rim of the hopper and having a weight attached to its end outside the hopper, which weight does not entirely balance the weight of the helically wound disc, the parts engaging the guide member and the scraping tools. The portion of the cord, rope or wire located outside the hopper may be provided with a marking device or a stop cooperating with a marking device or a stop fixedly mounted within the range of movement of the first mentioned marking device or stop. Thus it is possible to indicate the extent to which the hopper has been emptied and even to effect a refilling of the hopper mechanically or electrically. Indicating and actuating devices of this type are known per se.

An embodiment and the mode of operation of the apparatus according to the invention will be described and explained with reference to the accompanying drawing, in which FIGURE 1 is a schematic view of a vertical section of the apparatus;

FIGURE 2 is an enlarged side elevation of a portion of the guide member together with the helically wound disc surrounding said member, the scraping means and the elements connecting said disc to said guide member; and FIGURE 3 is a cross-section taken on line III—III in FIGURE 2.

The filling and mixing apparatus comprises a hopper 1 mounted for rotation about a vertical axis and having a lower cylindrical outlet opening 2 extending into a conveyor tube 4 provided with a conveying worm 3.

A flat rod 6 is held by a stationary arm 5 in such a position that its longitudinal axis coincides with the axis of rotation of the hopper 1 and that its lower end extends through the outlet opening 2 of the hopper 1, the cross sectional area of which outlet opening is only partly occupied by said rod.

The rod 6 in addition to loosing the material bearing against it serves for guiding a carriage 7 which is movable up and down along said rod on rollers 8 mounted thereon and which carries a helically wound sector-shaped disc 9 partly surrounding said rod. A wire 10 has one end secured to the lowermost point of the periphery of said disc, the wire 10 serving as a scraping means, which wire is passed over a pulley 11 and has on the end thereof located outside the hopper a weight 12. The weight 12 weighs slightly less than the carriage 7, rollers 8, and disc 9. A second scraping means in the form of a rod 13 extends downwardly and parallel to the wall of the hopper to a point in close proximity to the guiding rod 6 and is secured to the helically wound disc 9 so that it is substantially in alignment with the wire 10.

The operation of the filling and mixing apparatus is as follows: After the hopper has been filled with the material from a mixing apparatus or a container and after said hopper 1 has been set rotating, the disc 9 which is helically wound in a direction opposite to the direction of rotation of the hopper 1, is lifted by the action of the material rotating together with the hopper in the direction of the arrow 14, until it lies on the surface of the material on which it will exert a slight pressure due to the fact that the disc, carriage and wheels outweigh the weight 12. At the same time the rod 6 will form a cylindrical channel in the material, the loosed material flowing downwardly along the rod 6 and through the outlet opening 2 into the conveyor tube 4.

The channel formed by the guide member after the material thus loosed has flowed out of the hopper will remain intact in the case of materials having caking properties, and in the case of readily flowing material it will constantly be formed over again. Any material which is loosed by the rising helically wound disc 9, the carriage 7 and rollers 9 and the scraping means can also flow downwardly through said channel towards and out of the outlet opening 2.

During the further rotation of the hopper 1 the cylindrical channel formed by the guide rod 6 is widened out in the shape of a funnel from the top downwards by the scraper 13 and the wire 10 while the particles loosed from the wall of the funnel shaped channel by said means will flow through the channel surrounding the guide rod 6 towards the outlet opening 2 and into the tube 4.

Said flow is maintained by the relative movement between the guide member and the material in the hopper. Material will constantly be scraped off from the wall in thin layers and flow downwardly in the central channel, while the helically wound disc 9 with its associated scraping means will gradually descend and the funnel formed will become wider and wider until finally the hopper is almost or entirely empty. The thickness of the layer removed from the face of the funnel and consequently the extent to which agglomerates are broken up admits of being regulated within wide limits by an appropriate selection of the gauge of the scraping wire 10 and of the weight of the counter-weight 12.

In this manner the total contents of the hopper 1 are gradually and successively loosed, mixed and carried off during the gradual descent of the helically wound disc 9 and the scraping means 10 and 13. A stop 16 secured to the wire 10 above the weight 12 will move upwardly as the disc 9 moves downwardly and said stop will contact a signalling device 15 to indicate that the hopper 1 must be filled again, and if necessary it may limit the extent of the descent of the disc 9. In addition the arrangement may be such that said stop will actuate means for automatically refilling the hopper.

Independently of the size of the container 1 and independently of the kind of material with which it is filled as well as the tendency of said material to stick and agglomerate, the filling and mixing apparatus according to the invention ensures that the material will flow therefrom in a properly mixed condition.

Deviations of the structural design of the apparatus from the embodiment shown are possible. Thus, for example, the container 1 may be stationary and the rod 6 together with the disc 9 guided along said rod and the scraping means 10 and 13 may be set rotating about the axis of the container.

It is also possible for the hopper 1 instead of being conical over its entire height to have a cylindrical upper portion and a conical bottom. In this case it is to be preferred to replace the wire 10 by a scraper mounted on the disc 9 and directed obliquely outwardly and upwardly, the upper end of which scraper extends to a point in close proximity to the inner wall of the hopper.

I claim:

1. A filling and mixing apparatus for powdered and granular material comprising a hopper member having a vertical axis, the bottom of said hopper tapering downwardly and having a central cylindrical outlet opening at the lower end, a guide member located on the axis of said hopper and extending into the outlet opening, the cross-sectional area of said guide member being polygonal and only partly taking up the area of said outlet opening, one of said members being rotatable about the vertical axis and the other being fixed, an annular sector-shaped disc extending helically around said guide member in a direction opposite to the direction of rotation of said one member and at least partly surrounding the guide member being upwardly and downwardly movable along said guide member for following the upper surface of the contents of said hopper member, at least one scraping means on said disc extending substantially parallel to the wall of said hopper member for scraping the upper surface of the hopper contents and conveying the loosened material toward the guide member.

2. A filling and mixing apparatus as claimed in claim 1 in which said hopper member is rotatable and said guide member is fixed.

3. A mixing and filling apparatus as claimed in claim 2, in which said scraping means comprise a rod mounted on the edge of said disc extending downwardly parallel to the bottom of the hopper to a point adjacent said prismatic guide member.

4. A mixing and filling apparatus as claimed in claim 2, in which said scraping means comprises a cord, rope or wire running from the helically wound disc over the rim of the hopper member, a stationary pulley adjacent the rim over which the cord, rope or wire runs, and a weight attached to the end of the cord, rope or wire located outside the hopper member, which weight is slightly less the weight of the helically wound disc and the scraping means.

5. A mixing and filling apparatus as claimed in claim 4, in which the portion of the cord, rope or wire located outside the hopper member has a marking device thereon, and a stationary indicating device with which said marking device operates for indicating the extent to which the hopper member has been emptied.

6. A mixing and filling apparatus as claimed in claim 4, in which the portion of the cord, rope or wire located outside the hopper member has a stop thereon, and a stationary stop with which said stop cooperates for limiting the extent of the descent of the helically wound disc, and means actuated by said stationary stop for refilling the hopper.

References Cited in the file of this patent

UNITED STATES PATENTS

| | | |
|---|---|---|
| 469,370 | Cutts | Feb. 23, 1892 |
| 1,323,401 | McCaskie | Dec. 2, 1919 |
| 1,834,321 | Tervo | Dec. 1, 1931 |
| 1,989,322 | Leavitt | Jan. 29, 1935 |
| 2,545,992 | Dedio | Mar. 20, 1951 |
| 2,781,952 | Mahoney | Feb. 19, 1957 |

FOREIGN PATENTS

| | | |
|---|---|---|
| 11,171 | Great Britain | June 8, 1894 |